Jan. 19, 1926. 1,569,888
H. E. SHELLER
STEERING WHEEL
Filed Oct. 26, 1923 2 Sheets-Sheet 2
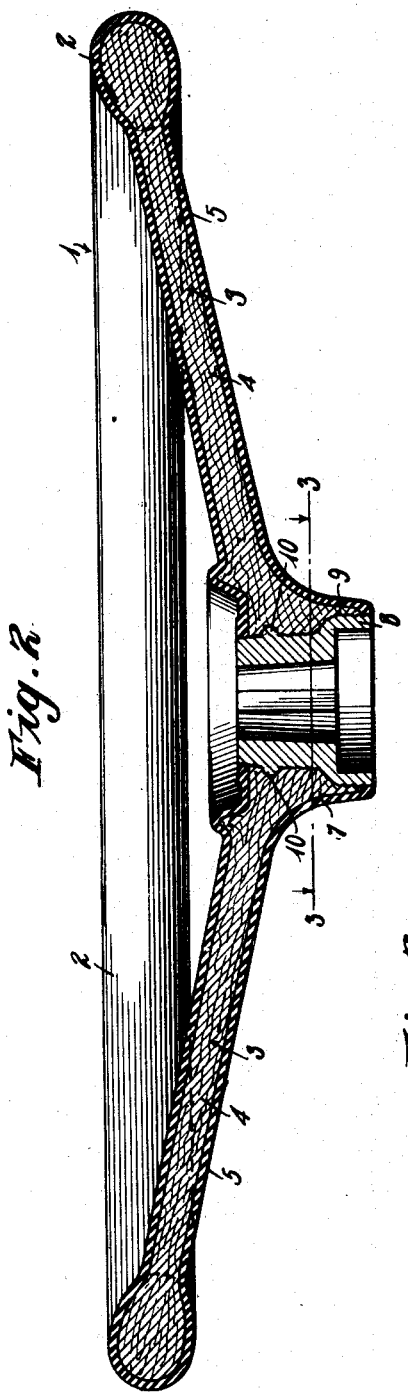
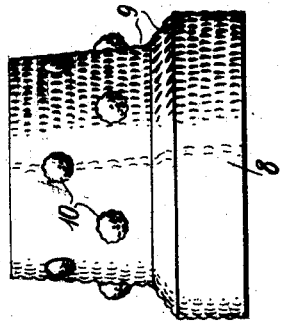
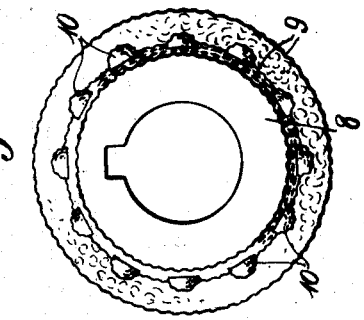
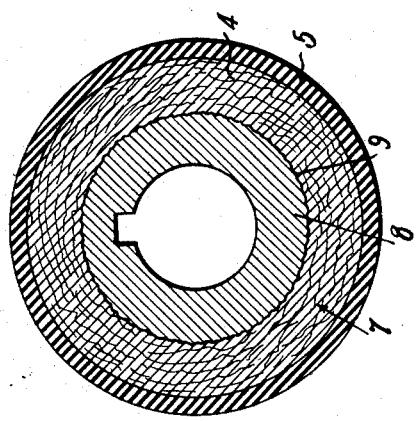
Inventor
Harry E. Sheller
By Bacon & Thomas
Attorneys Patented Jan. 19, 1926.

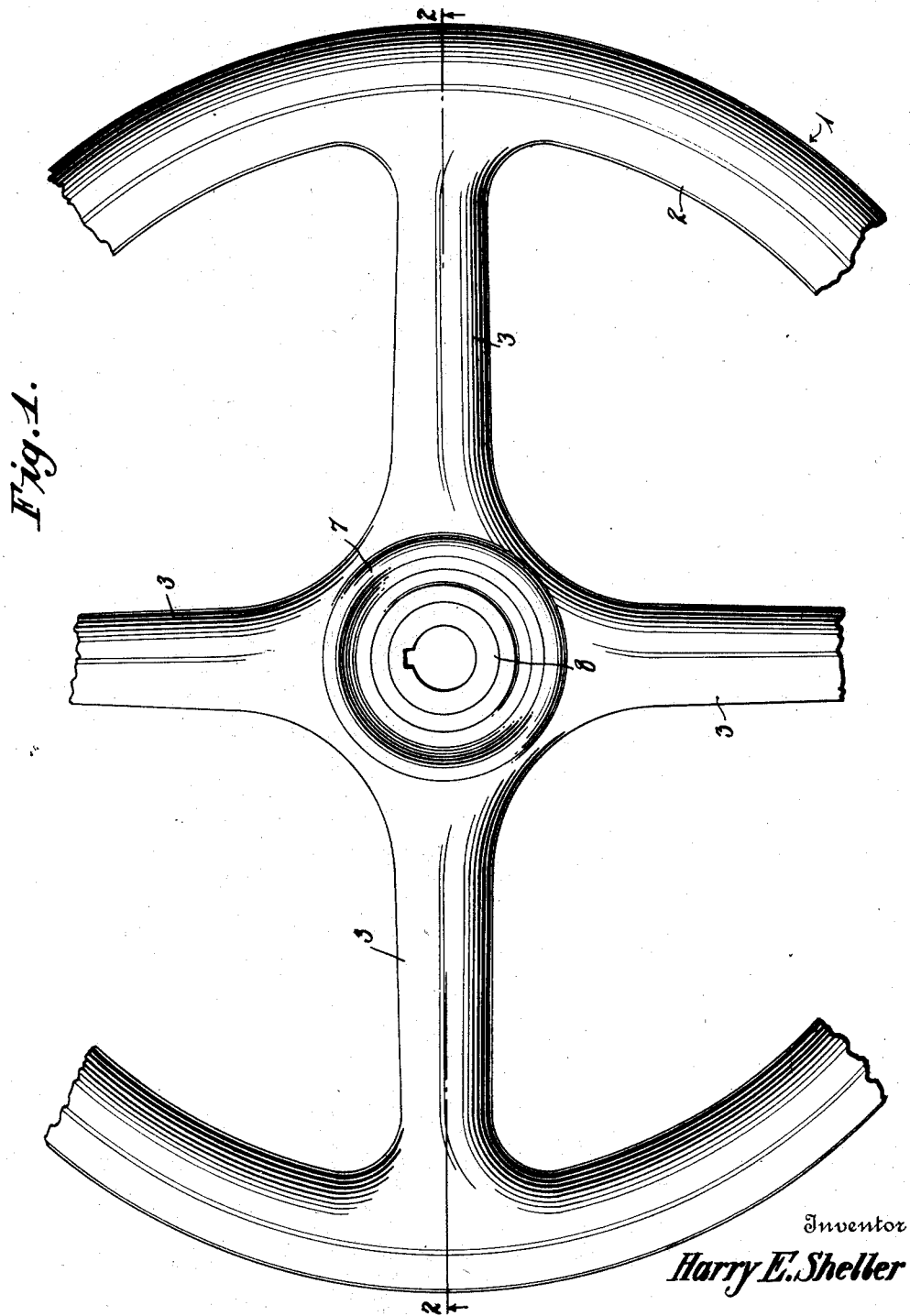

1,569,888

UNITED STATES PATENT OFFICE.

HARRY E. SHELLER, OF PORTLAND, INDIANA.

STEERING WHEEL.

Application filed October 26, 1923. Serial No. 670,962.

*To all whom it may concern:*

Be it known that I, HARRY E. SHELLER, a citizen of the United States, residing at Portland, in the county of Jay and State of Indiana, have invented certain new and useful Improvements in Steering Wheels, of which the following is a specification.

The invention relates to improvements in steering wheels adapted for use on motor vehicles.

It is an object of the invention to provide a plastic steering wheel, the interior of which is composed of vulcanized crude rubber with shoddy material surrounded with a layer of relatively high grade rubber, which, when vulcanized, gives the outer surface of the wheel a very pleasing appearance, while the interior is constructed of materials necessary to withstand all ordinary strains.

The invention more particularly aims to provide a steering wheel of this character where the spokes are composed of the plastic material, the only metal contained in the wheel being an inserted metallic hub portion.

In the accompanying drawings I have disclosed one embodiment of the invention, in which Figure 1 represents a top view of the parts broken away.

Figure 2 is a transverse section on line 2—2 of Figure 1.

Figure 3 is a section on line 3—3 of Figure 2; and,

Figures 4 and 5 are detail views of the collar.

Referring now more particularly to the drawings, wherein like reference characters indicate corresponding parts, the numeral 1 designates the steering wheel having the usual rim portion 2 which is shown in section in Figure 2, and also the integral plastic spokes 3. The interior of the rim 2 and the spokes 3 is composed or is produced from what I designate as a mixture of crude rubber and shoddy compounds, vegetable matter, straw, fiber, and the like, mixed with rubber milk or otherwise, which is produced in the form of a tube or in a mold. The core can be composed of various materials, such as crude rubber with shoddy compounds, vegetable matter, straw, fiber, and the like, and this inner core need not be made in a tubing machine. For instance, the core or filler can be placed in a mold and the mold cavity made of sufficient size to receive the layer of rubber applied therearound, which will be later described. This mold is then subjected to a vulcanizing temperature while the parts are under a hydraulic pressure. This interior is designated by the reference character 4. Surrounding the interior of shoddy reinforcing material there is provided a wrapping 5 of higher grade rubber, preferably made in a calender machine, cut in widths and lengths required for various sizes and when vulcanized forms a wheel having a smooth and hard surface. The entire wheel with its spokes after being formed is subjected to vulcanization and the interior core, as well as the strips of high grade rubber forming the surface thereof are thoroughly vulcanized, producing a hard non-yielding wheel, which does not contain the characteristics of a soft pliable rubber wheel produced from semicured rubber.

The spokes are connected to a collar at their inner ends, as indicated by the character 7, and before the wheel is subjected to vulcanization I insert in an aperture in this collar 7 a metallic hub 8 which is formed with a roughened surface 9 and with a series of projecting points 10 which enter the shoddy material forming the interior of the wheel. This shoddy material prior to vulcanization is soft so that it is possible to insert the metallic hub in position, but when the wheel is vulcanized the shoddy material as well as the surface of higher grade rubber becomes exceedingly hard, and tough, and is so firmly united to the hub by reason of the roughened surface 9 and the projections 10, that it cannot be disengaged therefrom. The hub, may, instead of having the projections 10, be provided with indentations for receiving the plastic rubber material that will flow therein during vulcanization. In fact, it is only necessary that the structure be such that a firm interlock is provided between the collar and the plastic intercore of the wheel. The plastic material coacting with this hub is sufficiently strong to stand all strains and stresses, and will not yield or give when the wheel is in use, so as to prevent disengagement of the wheel from the hub. This, of course, is due to the hard non-yielding state of the hard plastic material which has been vulcanized under a superatmospheric pressure, of say, 75 pounds per inch. It therefore follows that the wheel with its spokes and the connecting collar therefor is composed of plastic material, but there is united to this collar the metallic hub 8 which is, of course, needed with a steering wheel of a plastic character, and which, due to the peculiar character of the wheel firmly remains in permanent connection therewith.

Having thus described my invention, what I claim is:

A steering wheel having a rim portion and a plurality of spokes, a collar connecting the inner ends of said entire wheel including said spokes, said rim portion, spokes and collar being composed of an inner layer or core of vulcanized rubber with a filler having an outer layer of rubber adapted to present a smooth uninterrupted surface over the entire wheel in combination with a metallic hub disposed within said collar during vulcanization of the wheel, to be permanently united thereto, said metallic hub being provided on its periphery with a plurality of staggeredly positioned projections for causing a permanent interlocking engagement between said collar and said metallic hub.

In testimony whereof I affix my signature.

HARRY E. SHELLER.